Patented Dec. 29, 1931

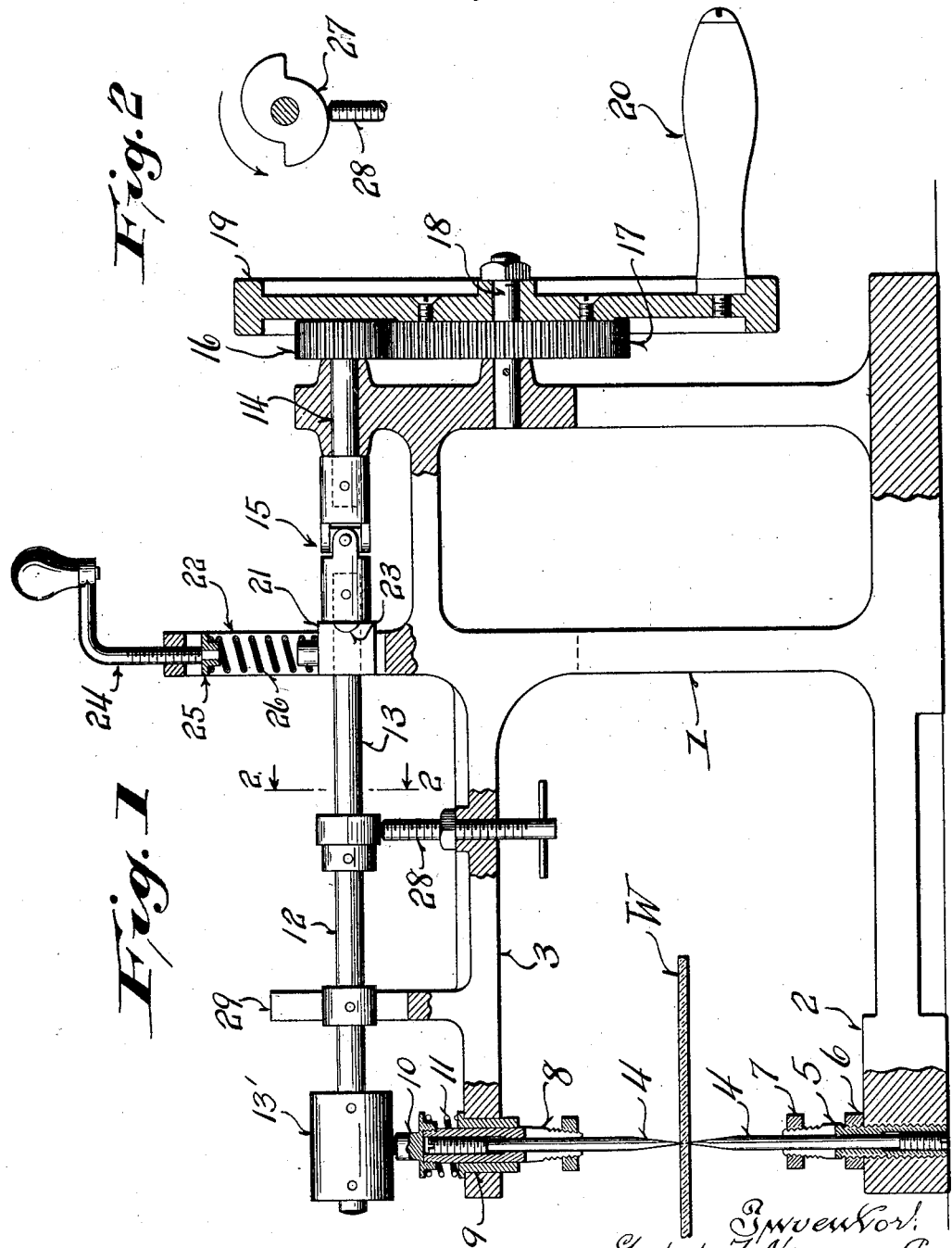

1,838,782

UNITED STATES PATENT OFFICE

GUSTAVE F. NEUMANN, JR., OF MILWAUKEE, WISCONSIN

MACHINE FOR CUTTING SLATE, ROOFING TILE, AND THE LIKE

Application filed April 9, 1931. Serial No. 528,878.

This invention pertains to a machine for cutting slate, roofing tile, and the like, and has primarily for its object to provide a machine adapted to mechanically cut material of the foregoing character, whereas heretofore this has been accomplished by manual means, which has resulted in considerable breakage and an uneven cut, due to the fact that the pressure exerted upon the cutting tools employed could not be regulated to the degree required.

With the above and other objects in view, which will appear as the description proceeds, the invention resides in the novel construction, combination and arrangement of parts substantially as hereinafter described and more particularly defined by the appended claims, it being understood that such changes in the precise embodiment of the herein disclosed invention may be made as come within the scope of the claim.

In the accompanying drawings is illustrated one complete example of the physical embodiment of the present invention constructed according to the best mode so far devised for the practical application of the principles thereof.

Figure 1 is a side elevation of a machine constructed in accordance with the present invention, with parts broken away and in section to more clearly illustrate the structural details, and Figure 2 is a transverse detailed sectional view taken on the line 2—2 of Figure 1.

Referring now more particularly to the accompanying drawings, the numeral 1 designates a frame of suitable design to accommodate the mechanism required to carry out the present invention, and comprises the base 2 and an opposed laterally projecting arm 3 positioned above said base. Carried by the base 2 and the arm 3 is a pair of opposed work-engaging tools 4, preferably in the form of chisels, which cooperate with each other, in a manner to be hereinafter described, for cutting the work material positioned between them. The lower chisel or tool 4 is adjustably mounted in a sleeve 5 which is threaded into the base 2 and held therein by a jam nut 6. The exposed end of the sleeve 5 is longitudinally slotted and provided with an exteriorly tapered thread for the reception of the nut 7, whereby the chisel, which is threaded within the sleeve, may be clamped in adjusted position.

The upper chisel 4 is mounted in the sleeve 8 similar in construction to the sleeve 5, except in that it is slidably mounted within a bushing 9 carried by the arm 3. Threaded on the upper end of the sleeve 8 is a head 10 provided with a flange for the reception of a coiled spring which surrounds the sleeve 8 and works against the bushing 9 to normally hold the tool 4 in raised position. It will be noted that the upper chisel is adjustable within the sleeve 8 in the same manner as provided for the lower chisel.

For the purpose of actuating the upper chisel 4 and causing the same to engage the work W in cooperation with the lower chisel, the tappet 12 is provided which comprises an arm 13 on the outer end of which is mounted a head 13' adapted to engage the head 10 carried by the sleeve 8.

The opposite end of the rod 13 is connected with a shaft 14, journaled in the frame by means of a universal coupling 15, and mounted on the outer end of the shaft 14 is a gear 16 meshing with the gear 17 carried on the stud 18, which stud is secured within the frame 1. Connected with the gear 17 is a flywheel 19 that carries an operating handle 20. Mounted on the rod 13, abutting the universal connection 15, is a bearing block 21 slidably mounted within the vertical frame extension 22. The bearing block 21 is provided with a lateral projection 23 adapted to engage the base of the extension 22, thus holding the bearing block against longitudinal movement on the shaft 14.

Threaded into the frame extension 22 is a crank 24 which carries a flanged head 25 which receives the spring 26 which works against the bearing block 21, thus serving to normally urge the tappet downwardly.

Secured on the rod 13 intermediate its ends is a cam 27 adapted to engage the adjustable stop 28 which is threaded to the arm 3 and locked in its adjusted position by means of a jam nut. In addition to the slotted frame extension 22 which guides the bearing block 21, the tappet is further held against lateral movement by a vertical U-shaped guide 29 carried by the arm 3.

Taking up the operation of the machine, the work W is placed between the tools or chisels 4, and the flywheel is then rotated by means of the handle 20, which operation, through the geared connection between the flywheel and the shaft 14, will cause the latter to rotate which in turn will rotate the tappet rod 13.

As this takes place, the cam 27 working on the stop 28 will cause the tappet 12 to be oscillated in a vertical plane, the high spots of the cam 27 forcing the same upwardly against the spring 26 and the force of gravity which is materially increased by the weighted head 13' mounted on the free end of the tappet arm 13. As the upward movement of the tappet takes place, obviously the spring 11 will cause the sleeve 8 and the upper chisels 4 to follow the head 13', and when the high portion of the cam 27 passes the stock 28, the tappet is dropped thus exerting a hammer blow on the upper chisel which, cooperating with the lower tool, will serve to cut the work material simultaneously upon opposite sides.

From the foregoing description it will be apparent that the force of the blow to be exerted upon the upper chisel 4 can be regulated in any desired degree by means of the crank 24 which adjusts the tension on the spring 26. Furthermore, the lifting action exerted upon the tappet by means of the cam, can be regulated to the desired movement by means of the adjustable stop 28.

It will be further seen that compensation for wear and sharpening of the tools, as well as accommodating the machine to operate upon material of various thicknesses, is provided for any adjustment of the chisels within their respective sleeves.

While I have illustrated and described manual means for actuating the present invention, it will be quite obvious that the same may be driven by a motor, or other form of power, without departing from the invention, or effecting its mode of operation.

From the foregoing it will be seen that a simple and inexpensive mechanism has been provided, which will rapidly and evenly cut material of various characteristics and thicknesses, and which will eliminate breakage, due to provision of means for nicely regulating and obtaining the exact degree of force required and depending upon the characteristics of material to be worked upon.

I claim:

A machine of the class described comprising a frame having a fixedly mounted member, a movable chisel carried by said frame and cooperating with said member, a revolubly mounted shaft slidably guided within said frame and having a striking portion for actuating said chisel, a slidable bearing carrying said shaft, an adjustable spring bearing upon said cross head, a cam carried by said shaft, and an adjustable projecting member cooperating with said cam, whereby when said shaft is rotated, said chisel will be struck blows whose force may be adjusted, and whereby the stroke of said slidably guided shaft may be adjusted.

In testimony that I claim the foregoing I have hereunto set my hand at Milwaukee, in the county of Milwaukee and State of Wisconsin.

GUSTAVE F. NEUMANN, Jr.